United States Patent
Kato et al.

(10) Patent No.: US 7,490,818 B2
(45) Date of Patent: Feb. 17, 2009

(54) SPRING SEAT OF SUSPENSION FOR AUTOMOTIVE VEHICLE

(75) Inventors: Kazuhiko Kato, Komaki (JP); Yuji Sato, Komaki (JP)

(73) Assignee: Tokai Rubber Industries, Ltd., Komaki-shi (JP)

(*) Notice: Subject to any disclaimer, the term of this patent is extended or adjusted under 35 U.S.C. 154(b) by 0 days.

(21) Appl. No.: 11/674,818

(22) Filed: Feb. 14, 2007

(65) Prior Publication Data

US 2007/0194507 A1    Aug. 23, 2007

(30) Foreign Application Priority Data

Feb. 21, 2006  (JP)  ............... 2006-044245
Nov. 27, 2006  (JP)  ............... 2006-318687

(51) Int. Cl.
*B60G 13/00* (2006.01)
*B60G 15/00* (2006.01)

(52) U.S. Cl. .................. 267/220; 267/221; 267/219
(58) Field of Classification Search .............. 267/220, 267/221, 219
See application file for complete search history.

(56) References Cited

U.S. PATENT DOCUMENTS

| | | | | |
|---|---|---|---|---|
| 4,465,296 A | * | 8/1984 | Shiratori et al. | 280/124.155 |
| 5,454,585 A | * | 10/1995 | Dronen et al. | 280/124.145 |
| 5,788,262 A | * | 8/1998 | Dazy et al. | 280/124.155 |
| 6,948,728 B2 | * | 9/2005 | Pflugner et al. | 280/124.147 |
| 2003/0178269 A1 | * | 9/2003 | Hayashi et al. | 188/321.11 |
| 2005/0155829 A1 | * | 7/2005 | Germano et al. | 188/321.11 |

FOREIGN PATENT DOCUMENTS

| | | |
|---|---|---|
| JP | 10-184752 | 7/1998 |
| JP | 10-213168 | 8/1998 |
| JP | 10-297234 | 11/1998 |
| JP | 2959364 | 7/1999 |
| JP | 2001-248674 | 9/2001 |
| JP | 2002-130351 | 5/2002 |
| JP | 2002-323078 | 11/2002 |
| JP | 2003-262245 | 9/2003 |

* cited by examiner

*Primary Examiner*—Robert A Siconolfi
*Assistant Examiner*—Mahbubur Rashid
(74) *Attorney, Agent, or Firm*—Oblon, Spivak, McClelland, Maier & Neustadt, P.C.

(57) ABSTRACT

A spring seat of a suspension for an automotive vehicle, which is capable of preventing occurrence of noises and preventing buckling deformations thereof has a spring seat body composed of an elastic rubber body. The spring seat body is interposed and pressed between a coil spring and an opposed member. This spring seat body has a plurality of non-through holes which are formed so as to be directed toward a first surface of the spring seat body from a second surface located on the side of the opposed member, and which have openings on the side of the second surface. In addition, the spring seat body has air passages connecting the non-through holes with the surface of the spring seat body other than the second surface on the side of the opposed member.

8 Claims, 8 Drawing Sheets

SPRING SEAT OF SUSPENSION FOR AUTOMOTIVE VEHICLE

INCORPORATION BY REFERENCE

This invention is based on Japanese Patent Application No. 2006-044245 filed on Feb. 21, 2006, and No. 2006-318687 filed on Nov. 27, 2006, the entire contents of which are incorporated herein by reference.

BACKGROUND OF THE INVENTION

1. Field of the Invention

The present invention relates to a spring seat of a suspension for an automotive vehicle, which is provided between a coil spring and an opposed member for reduces transmission vibrations between the coil spring and the opposed member, the opposed member being one member selected from a body member and a support member for a wheel.

2. Description of Related Art

As shown on pages 5 through 6 of "Vibration-Isolating • Shock-Absorbing Device (the last volume)", The collected mechanism diagrams published by The Japan society of Mechanical Engineers on Sep. 10, 1977, in one example of the conventional spring seat of a suspension for an automotive vehicle, the spring seat has been composed of only a cylindrical elastic rubber body. This spring seat has non-through holes which are formed in a cylindrical member from the side of the opposed member toward the side of the coil spring. These non-through holes are formed in a circumferential direction of the cylindrical member.

And, recently, in order to improve the stiffness of the spring seat, the spring seat including a core member composed of metal or resin in addition to the elastic rubber body has been proposed (see JP-A-2002-130351). With this arrangement, the spring characteristics can be made soft by virtue of the elastic rubber body, and the stiffness of the entire spring seat can be improved by virtue of the core member.

Recently, in order to respond to the demand for the reduction of production costs, it has been considered to compose the spring seat of only the elastic rubber body without using any core member.

The elastic rubber body of the spring seat disclosed in the above-described publication has radially extending cutouts in a surface on the side of the opposed member, and accordingly, the elastic rubber body has radially extending projections on the side of the opposed member. Where the spring seat including only the elastic rubber body thus arranged without including any core member is interposed between the coil spring and the opposed member, and is pressed therewith, the radially extending projections may be deformed into buckling configurations.

When the radially extending projections are deformed into buckling configurations, the relative positions of the coil spring and the spring seat may be offset from each other. In this case, the center axis located at a spring center of the coil spring may be offset from the axial center of the spring seat, namely so-called misalignment of centers may occur. As a result, the coil spring may come off the spring seat, and consequently, the spring seat may become impossible to support the coil spring so as not to properly perform the function of reducing transmission vibrations.

In addition, deformed projections are exposed in an outer peripheral surface of the spring seat so that the appearance quality of the spring seat is degraded.

To solve these problems, it can be considered to form such non-through holes as disclosed in the above-described collected mechanism diagrams without forming radially extending cutouts in the elastic rubber body. Indeed, by forming the non-through holes, the buckling deformations of the spring seat can be prevented. Therefore, the misalignment of centers of the spring seat as well as the degradation of the appearance quality thereof can be prevented.

On the other hand, with the spring seat disclosed in the above described collected mechanism diagrams, internal spaces defined with the non-through holes provided in the spring seal perform compression and return motions as the coil spring expands and contracts when an automotive vehicle is running, for example. An entire surface of the spring seat, which is on the side of the opposed member, contacts the opposed member. And openings of the non-through holes provided in the spring seat are located on the side of the opposed member. Namely, the internal spaces of the non-through holes define closed spaces depending on the deformed state of the elastic rubber body. Consequently, when the non-through holes return from the compressed state, for example, the internal spaces of the non-through holes become partially open from the closed state so that noises may occur.

SUMMARY OF THE INVENTION

The present invention has been made in view of the above-described circumstances, and has an object of providing a spring seat of a suspension for an automotive vehicle, which is capable of preventing occurrence of noises while preventing buckling deformations thereof.

The spring seat of a suspension for an automotive vehicle in accordance with the present invention is interposed between a coil spring and an opposed member composed of a body member or a support member for a wheel, and operates to reduce transmission vibrations between the coil spring and the opposed member. And the spring seat is composed of an elastic rubber body, and has a spring seat body for closely attaching to an end of the coil spring and contacting the opposed member. The spring seat body includes a first surface for closely attaching to the end of the coil spring, a second surface located on a rear side of the first surface for contacting the opposed member, a plurality of non-through holes, each having an opening on the side of the second surface, and being directed from the second surface to the first surface, and first air passages, one end of each first air passages communicating with a predetermined first non-through hole, and the other end opening in a surface being one of surfaces of the spring seat body and being other than the second surface.

The openings of the non-through holes are located on the side of the second surface, that is on the side of the opposed member. Therefore, where only the non-through holes are provided, similarly to the conventional spring seat disclosed in the above-described collected mechanism drawings, noises may occur when the non-through holes return from the compressed state.

The spring seat body of the spring seat of the present invention, however, has the first air passages in addition to the non-through holes. Each first air passage connects the predetermined first non-through hole with the surface. Namely, when the predetermined first non-through hole is compressed and deformed, air in an interior of the predetermined first non-through hole flows out of the spring seat by way of the first air passage. On the other hand, when the predetermined first non-through hole returns from the compressed state, air flows into the interior of the predetermined first non-through hole from an exterior of the spring seat by way of the first air passage. Therefore, in any case, the predetermined first non-through hole does not define a closed space, and consequently, occurrence of conventionally encountered noises can be prevented.

Where the spring seat is composed of only the elastic rubber body which is disclosed in the above publication, the elastic rubber body is pressed with the coil spring and the opposed member so that projections of the elastic rubber body may be deformed. This is caused by that the projections are formed into radially extending columns, and these columns are deformed into buckling configurations.

On the other hand, the spring seat body of the spring seat of the present invention has the non-through holes and the first air passages. Therefore, the spring seat body of the spring seat of the present invention does not form a plurality of column-shaped projections, but the entire part corresponding to the column-shaped projections is combined integrally. Therefore, the spring seat body of the spring seat of the present invention exhibits a great stiffness against the buckling deformation thereof. Namely, the spring seat body becomes difficult to be deformed into a buckling configuration. Accordingly, the spring seat in accordance with the present invention can securely prevent the misalignment against the coil spring, thereby properly achieving the operation of reducing the transmission vibrations.

The first air passages may be arranged to directly connect one part of the non-through holes with the surface of the spring seat body, or may be arranged to directly connect all of the non-through holes with the surface of the spring seat body.

And the spring seat of a suspension for an automotive vehicle in accordance with the present invention may have holes-connection passages, each being adapted to connect two non-through holes each other, in addition to the first air passages. Namely, the first air passages are arranged to be directly connected with the surface of the spring seat body, whereas the holes-connection passage defines another air passage which connects the two non-through holes with each other.

Accordingly, the non-through hole which is not directly connected with the surface of the spring seat body by way of the first air passage communicates with the exterior of the spring seat body by way of the holes-connection passage, another non-through hole and the first air passage. Namely, the air passage for the non-through holes which do not directly communicate with the surface of the spring seat body by way of the first air passages is composed of the holes-connection passage communicating with the non-through hole, another non-through hole communicating with the holes-connection passage, and the first air passage communicating with the another non-through hole. With this arrangement, where there exist the non-through holes which do not directly communicate with the surface of the spring seat body by way of the first air passages, the air passages communicating with the spring seat body can be formed against all of the non-through holes.

As described above, the buckling deformations of the non-through holes and the first air passages become small, as compared with the projections as disclosed in the above described publication. However, they may be deformed slightly into buckling configurations. Where the first air passages open on the side of the outer peripheral surface, parts defining the first air passages may be deformed into buckling configurations, whereby the appearance quality of the outer peripheral surface is degraded.

Accordingly, it is preferable that the spring seat body of the spring seat is composed of a cylindrical body having an inner peripheral surface, and the other end of the first air passage is made open in the inner peripheral surface of the spring seat body. Namely, the first air passage does not open in the outer peripheral surface of the spring seat body. With this arrangement, in the outer peripheral surface of the spring seat body, there does not exist any part which would deform into a buckling configuration. Therefore, the appearance quality of the outer peripheral surface can be prevented from being degraded.

And, where the other end of the first air passage opens in the inner peripheral surface of the spring seat body, the following arrangement may be adopted. Namely, the spring seat of the suspension for an automotive vehicle in accordance with the present invention may also have the arrangement that engaged portions project from the inner peripheral surface of the spring seat body inwardly for engagement with engaging portions of the opposed member, and the predetermined first non-through hole is the non-through hole of which at least one part does not interfere with the engaged portion in a radial direction thereof.

Where the spring seat is provided with the engaged portions in the inner peripheral surface of the spring seat body, and the non-through holes interfere with the engaging portions in radial directions of the spring seat body, it is not easy to form the first air passages. Accordingly, by connecting the other end of the first air passage with the predetermined first non-through hole of which at least one part does not interfere with the engaged portion in a radial direction thereof, the first air passage is readily formed.

And where the spring seat of a suspension for an automotive vehicle in accordance with the present has holes-connection passages, as described above, the following arrangement may be adopted. Namely, the spring seat body of the spring seat in accordance with the present invention is composed of a cylindrical body having an inner peripheral surface, and engaged portions which project from the inner peripheral surface of the spring seat body inwardly for engagement with engaging portions of the opposed member is further provided, the other end of the first air passage opens in the inner peripheral surface of the spring seat body, the predetermined first non-through hole is the non-through hole of which at least one part does not interfere with the engaged portion in a radial direction thereof, and at least one end of each of the holes-connection passages communicates with each of the predetermined second non-through holes which interfere with the engaged portions in radial directions thereof.

The holes-connection passages can be connected with the non-through holes which do not communicate with the first air passages. Namely, even if there exist non-through holes which do not directly communicate with surfaces of the spring seat body with the first air passages, because of the engaged portions, air passages communicating with the spring seat body can be formed against all of the non-through holes.

And the area of the cross-section of the first air passage, which intersects perpendicularly to the air flowing direction therein, may be not more than the opening area of the predetermined first non-through hole on the side of the second surface. The air flowing direction in the first air passage is the direction from the predetermined first non-through hole communicating with the one end of the first air passage toward the surface of the spring seat body communicating with the other end of the first air passage, or the opposite direction thereto.

And, since the area of the cross-section of the first air passage, which intersects perpendicularly to the air flowing direction, is not more than the opening area of the predetermined first non-through hole on the side of the second surface, occurrence of the buckling deformation, which is caused by the first air passage, can be restrained. The area of the cross-section of the first air passage, which intersects perpendicularly to the air flowing direction, may be less than the opening area of the predetermined first non-through hole on the side of the second surface. The cross-section of the first air passage, which intersects perpendicularly to the air flowing direction, may have the area capable of making air flow between the interior of the predetermined first non-through hole and the exterior of the spring seat body, where the spring seat body is pressed with the coil spring and the opposed member.

And where the spring seat of a suspension for an automotive vehicle in accordance with the present invention has holes-connection passages, the following arrangement may be adopted. Namely, the area of the cross-section of the holes-connection passage, which intersects perpendicularly to the air flowing direction, is not more than the opening area of the non-through hole which communicates with the holes-connection passage on the side of the second surface. The air flowing direction in the holes-connection passage is the direction from one of the non-through holes connected with the holes-connection passage toward the other one of them, or the opposite direction thereto.

And, since the area of the cross-section of the holes-connection passage, which intersects perpendicularly to the air flowing direction, is not more than the opening area of the non-through hole which communicates with the holes-connection passage on the side of the second surface, occurrence of the buckling deformation, which is caused by the holes-connection passage, can be restrained. The area of the cross-section of the holes-connection passage, which intersects perpendicularly to the air flowing direction, may be less than the opening area of the non-through hole which communicates with the holes-connection passage on the side of the second surface. The cross-section of the holes-connection passage, which intersects perpendicularly to the air flowing direction, may have the area capable of making air flow between the non-through holes which are connected with the holes-connection passage, where the spring seat body is pressed by the coil spring and the opposed member.

And the spring seat body is interposed and pressed between the coil spring and the opposed member. At this time, loads are mostly applied to the spring seat body in the portion corresponding to the position of the spring center of the coil spring. Therefore, it is preferable that there exist many portions other than the non-through holes, that are rubber portions of the elastic rubber body, in the portion to which loads are mostly applied. In this case, the position of the spring center is the position corresponding to the central diameter of the spring, around which the spring is wound.

Accordingly, the position of the center of the non-through hole may be arranged differently from the position of the spring center of the coil spring. With this arrangement, many rubber portions of the elastic rubber body can exist in the portion of the spring seat body, which corresponds to the spring center of the coil spring.

The plurality of non-through holes may include a plurality of smaller-diameter side non-through holes, each having a hole center on a first diameter, and a plurality of larger-diameter side non-through holes, each having a hole center on a second diameter which is greater than the first diameter. The first diameter and the second diameter are the diameters in the neighborhood of the spring diameter of the coil spring. The center of the first diameter on which the hole centers of the smaller-diameter side non-through holes and the center of the second diameter on which the hole centers of the larger-diameter side non-through holes are arranged so as to be located in approximately the same position.

In this case, if the hole center of the smaller-diameter side non-through hole and the hole center of the larger-diameter side non-through hole are formed in the same radial direction from the center of the first diameter (or the second diameter), the resultant configuration becomes similar to the configuration that cutouts are formed in the same radial direction thereof. Therefore, buckling deformation is readily formed, as encountered with the elastic rubber body disclosed in the above-described publication.

Accordingly, where the plurality of non-through holes include a plurality of smaller-diameter side non-through holes, each having a hole center on a first diameter, and a plurality of larger-diameter side non-through holes, each having a hole center on a second diameter which is greater than the first diameter, it is preferable to arrange the smaller-diameter side non-through holes and the larger-diameter side non-through holes alternately in a circumferential direction.

Since the smaller-diameter side non-through holes and the larger-diameter side non-through holes are arranged alternately in a circumferential direction, the hole centers of the smaller-diameter side non-through hole and the hole centers of the larger-diameter side non-through hole are not formed in the same radial direction from the center of the first diameter (or the second diameter). Therefore, the spring seat body can be certainly prevented from deforming into a buckling configuration.

With the spring seat of a suspension for an automotive vehicle in accordance with the present invention, occurrence of noises can be prevented while preventing buckling deformations thereof.

DETAILED DESCRIPTION OF THE PREFERRED EMBODIMENTS (1) A First Embodiment

Figure 1:
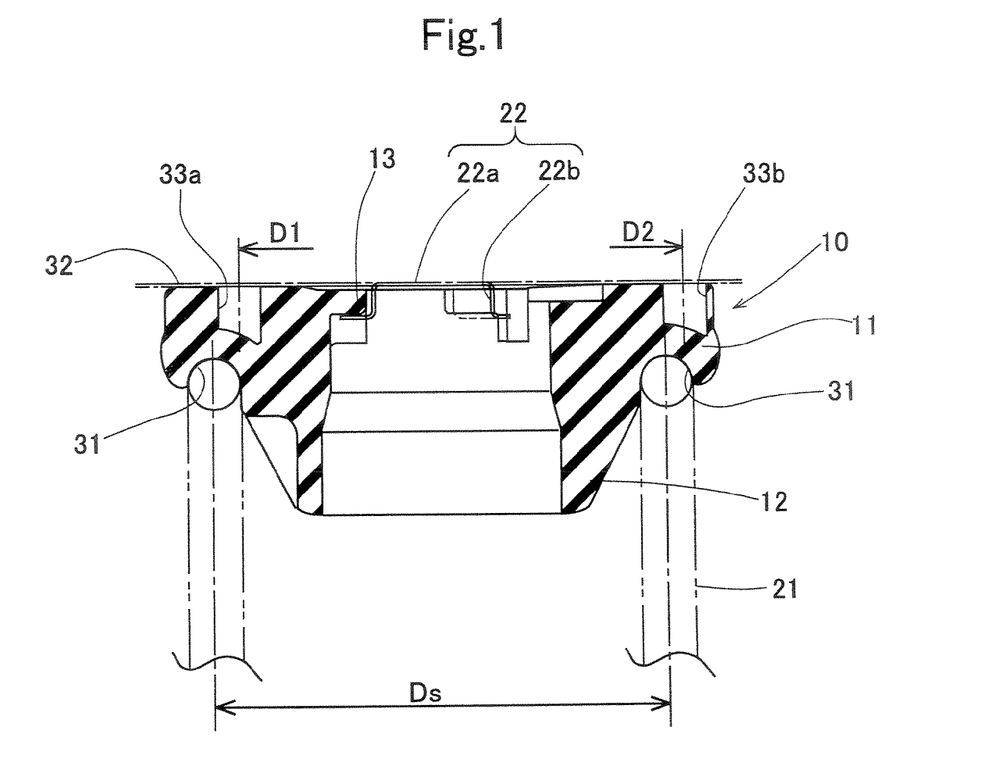
FIG. 1 is a diagram showing an assembled state of a spring seat 10 of a suspension for an automotive vehicle in a first embodiment of the present invention.
Figure 2:
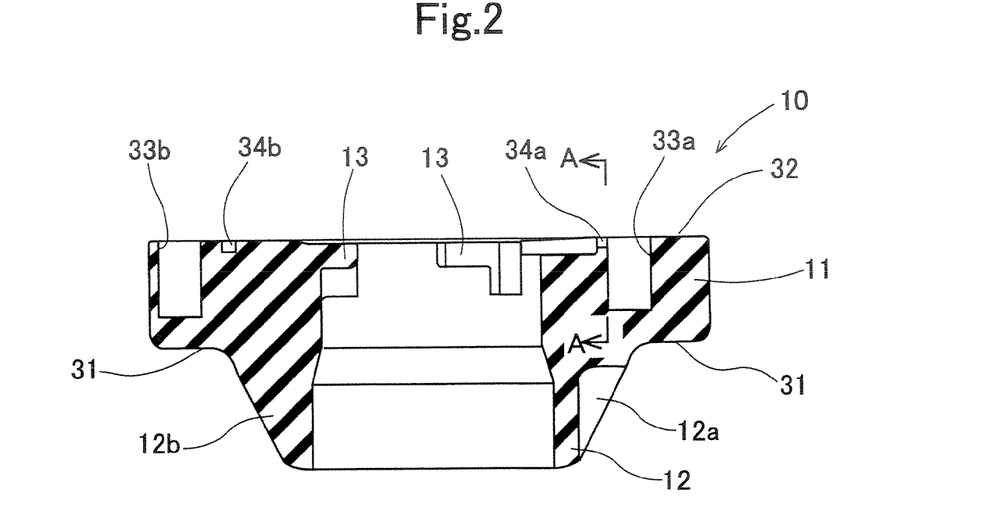
FIG. 2 is a longitudinal sectional view of the spring seat 10.
Figure 3:
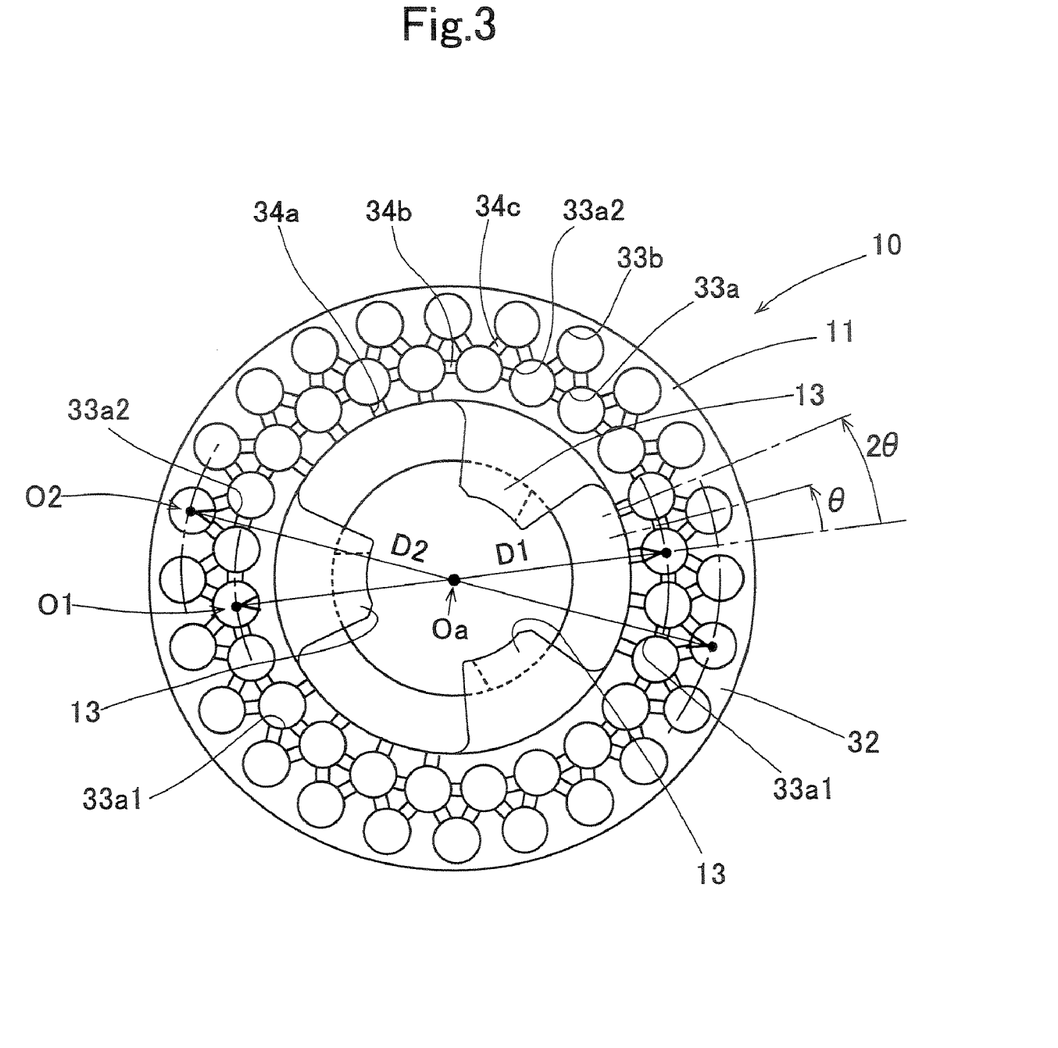
FIG. 3 is a plan view of the spring seat 10.
Figure 4:
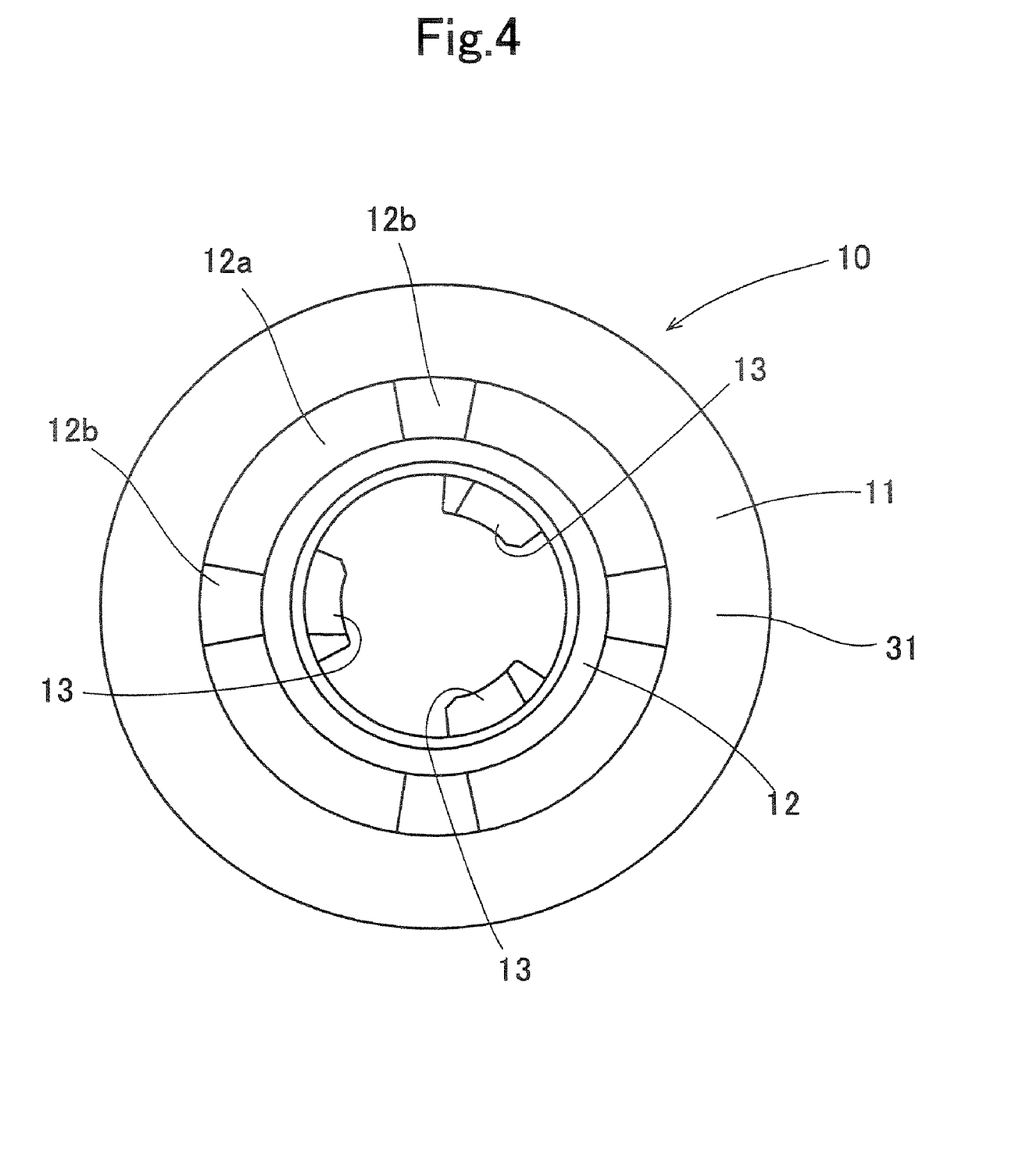
FIG. 4 is a bottom view of the spring seat 10.
Figure 5:
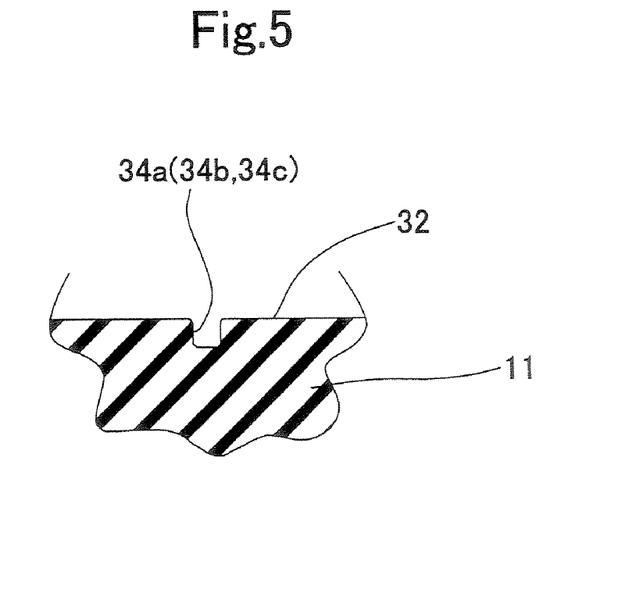
FIG. 5 is a partially cut away sectional view taken along the line A-A of FIG. 2.

Hereinafter, the present invention will be explained in more detail based on several embodiments. A first embodiment of the spring seat of a suspension for an automotive vehicle will be explained with reference to FIG. 1 through FIG. 5. FIG. 1 shows an assembling diagram of a spring seat 10 of a suspension for an automotive vehicle of the first embodiment. More specifically, FIG. 1 is an axial sectional view of the spring seat 10 which is interposed and pressed between a coil spring 21 of the suspension for the automotive vehicle, and a body member 22 as an opposed member. FIG. 2 shows an axial sectional view of the spring seat 10. FIG. 3 shows a plan view of the spring seat 10. FIG. 4 shows a bottom view of the spring seat 10. FIG. 5 shows a sectional view taken along the line A-A of FIG. 2. Hereinafter, in FIG. 1, the side of the body member 22 will be referred to as "upper side" relative to the spring seat 10, whereas the side of the coil spring 21 will be referred to as "lower side" relative to the spring seat 10.

As shown in FIG. 1, the spring seat 10 is interposed and pressed between the coil spring 21 and the body member 22. This spring seat 10 performs the function of reducing transmission vibrations between the coil spring 21 and the body member 22. And the spring seat 10 is interposed and pressed between the coil spring 21 and a vehicle wheel-supporting member (not shown). And the spring seat 10 performs the function of reducing transmission vibrations between the coil spring 21 and the vehicle wheel-supporting member.

Hereinafter, the coil spring 21 and the body member 22 will be explained. This coil spring 21 is shown by two-dot chain lines in FIG. 1. This coil spring 21 is composed of spring steel, etc., and is wound spirally. And the spring center diameter of the coil spring 21, that is the winding center diameter of the wound coil spring 21, is Ds.

The body member 22 is shown by one-dot chain lines in FIG. 1. This body member 22 has a flat plate portion 22a and three engaging portions 22b. The flat plate portion 22a is composed of metal, etc. and has a plate-shaped configuration. The engaging portions 22b respectively have an L-shaped cross-section, and are arranged so as to project downwardly of the flat plate portion 22a and open on an outer peripheral side thereof where a predetermined position (the axial center Oa of a later-describing spring seat body 11) is determined to be a center. These engaging portions 22b serve to engage with engaged portions 13 of the spring seat 10.

The spring seat 10 will be explained in more detail with reference to FIG. 2 through FIG. 5 in addition to FIG. 1. The spring seat 10 is composed of only an elastic rubber body which is formed and vulcanized. This spring seat 10 includes a spring seat body 11, a guide portion 12 and engaged portions 13.

The spring seat body 11 has a cylindrical configuration, and is arranged such that an axial direction thereof is directed in a vertical direction. And a lower end surface 31 of this spring seat body 11 (a first surface in the present invention) is a surface adapted to closely contact an upper end of the coil spring 21. Where the spring seat 10 is not pressed between the coil spring 21 and the body member 22, the lower end surface 31 of the spring seat body 11 defines a flat surface, as shown in FIG. 2. On the other hand, where the spring seat 10 is pressed between the coil spring 21 and the body member 22, the lower end surface 31 of the spring seat body 11 deforms such that the upper end of the coil spring 21 sticks therein, as shown in FIG. 1. In this case, the end of the coil spring 21 means a circumferential end of the coil spring 21.

And an upper end surface 32 of the spring seat body 11 (a second surface in the present invention) is located on the rear side of the lower end surface 31. This upper end surface 32 of the spring seat body 11 is the surface for contacting a lower surface of the flat plate portion 22a of the body member 22. Whether the spring seat 10 is pressed between the coil spring 21 and the body member 22 or not, the upper end surface 32 of the spring seat body 11 defines a flat surface, as shown in FIG. 1 and FIG. 2.

In addition, in the spring seat body 11, plurality of smaller-diameter side non-through holes 33a and plurality of larger-diameter side non-through holes 33b are formed at equal distances in a circumferential direction thereof. These non-through holes 33a and 33b respectively have an opening on the side of the upper end surface 32 of the spring seat body 11. And these non-through holes 33a and 33b are formed so as to be directed toward the lower end surface 31 from the upper end surface 32. Namely, these non-through holes 33a and 33b are formed in the parallel direction to the axial direction of the spring seat body 11 (in a vertical direction in FIG. 1 and FIG. 2). And these non-through holes 33a and 33b do not reach the lower end surface 31 of the spring seat body 11. Namely, the non-through holes 33a and 33b are closed with the lower end surface 31 of the spring seat body 11.

And these non-through holes 33a and 33b are composed of circular holes with the same diameter over the entire position of the axial direction thereof. Namely, the openings and the bottoms of the non-through holes 33a and 33b have the same circular configuration. In addition, the diameter (maximum hole width) of these non-through holes 33a and 33b are made to be less than the coil wire diameter of the coil spring 21.

In addition, as shown in FIG. 3, hole centers O1 of the smaller-diameter side non-through holes 33a are located on a first diameter D1 of which a center is located at the axial center Oa of the spring seat body 11 at equal distances. The first diameter D1 is less than the spring center diameter Ds. Namely, the hole centers O1 of the smaller-diameter side non-through holes 33a are located inside the position corresponding to the spring center diameter Ds of the coil spring 21.

And, as shown in FIG. 3, hole centers O2 of the larger-diameter side non-through holes 33b are located on a second diameter D2 of which a center is located at the axial center Oa of the spring seat body 11 at equal distances. The second diameter D2 is greater than the first diameter D1, and greater than the spring center diameter Ds. Namely, the hole centers O2 of the larger-diameter side non-through holes 33b are located outside the hole centers O1 of the smaller-diameter side non-through holes 33a, and outside the position corresponding to the spring center diameter Ds of the coil spring 21.

In addition, the smaller-diameter side non-through holes 33a and the larger-diameter side non-through holes 33b are arranged alternately in a circumferential direction. Namely, where seen from the axial center Oa of the spring seat body 11, the smaller-diameter side non-through holes 33a and the larger-diameter side non-through holes 33b are arranged alternately. In other words, the hole centers O1 of the smaller-diameter side non-through holes 33a and the hole centers O2 of the larger-diameter side non-through holes 33b are not located in the same radial direction from the axial center Oa of the spring seat body 11. More specifically, where the axial center Oa of the spring seat body 11 is determined to be the center, and the position of the hole center O1 of a predetermined smaller-diameter side non-through hole 33a is determined to be 0, for example, the hole center O2 of the larger-diameter side non-through hole 33b is located at an angle θ and the hole center O1 of the smaller-diameter side non-through hole 33b adjacent to the predetermined smaller-diameter side non-through hole 33a is located at an angle 2θ. And such a relation between the smaller-diameter side non-through holes 33a and the larger-diameter side non-through holes 33b continues over the entire circumference of the spring seat body 11.

Furthermore, in the spring seat body 11, a plurality of first air passages 34a, a plurality of second air passages 34b and a plurality of third air passages 34c are formed. The first air passages 34a, the second air passages 34b and the third air passages 34c are formed in the upper end surface 32 of the spring seat body 11 into a groove-shaped configuration.

One end of the first air passage 34a communicates with a predetermined first non-through hole 33a1 out of the smaller-diameter side non-through holes 33a, whereas the other end thereof opens in an inner peripheral surface of the spring seat body 11. Namely, the first air passage 34a communicates with the predetermined first non-through hole 33a1 and the inner peripheral surface of the spring seat body 11. Thus, the first air passage 34a acts as a passage for air flowing between the predetermined first non-through hole 33a1 and the exterior of the spring seat body 11. And in the first air passage 34a, air flows in the direction from the predetermined first non-through hole 33a1 towards the exterior of the spring seat body 11, or in the opposite direction thereto. More specifically, the first air passage 34a is formed to extend in a radial direction of the spring seat body 11.

As shown in FIG. 5, the cross-section of the first air passage 34a, which intersects perpendicularly to the air flowing direction (that is the radial direction of the spring seat body 11) has a rectangular shape. And the area of the cross-section of this first air passage 34a, which intersects perpendicularly to the air flowing direction, is made to be less than the area of the cross-section of the predetermined first non-through hole 33a1 (that is a vertical direction of FIG. 2). in this case, the area of the cross-section which is intersects perpendicularly to the hole axis direction of the predetermined first non-through hole 33a1 is equal to the area of an opening of the predetermined first non-through hole 33a.

Namely, the predetermined first non-through hole 33a1 which directly communicates with the first air passage 34a makes air flow towards the surface of the spring seat body 11 other than the upper end surface 32 by way of the first air passage 34a. In this case, the predetermined first non-through hole 33a1 which directly communicates with the first air passage 34a is the non-through hole out of the smaller-diameter side non-through holes 33a, which is located in the position where a later-describing engaged portion 13 is not provided on the inner peripheral side of the spring seat body 11. In other words, the predetermined first non-through hole 33a1 is the non-through hole of which at least one part does not interfere with the engaged portion 13 in a radial direction.

In addition, the second air passage 34b (holes-connection passage in the present invention) communicates with adjacent smaller-diameter side non-through holes 33. Namely, the second air passage 34b serves as the passage for making air flow to the adjacent smaller-diameter side non-through holes 33. More specifically, the second air passage 34b is formed in the position where the distance between the communicating smaller-diameter side non-through holes 33 is the shortest. And in the second air passage 34b, air flows in the direction from one smaller-diameter side non-through hole 33a towards the other smaller-diameter side non-through hole 33a, or in the opposite direction thereto. The cross-section of this second air passage 34b, which intersects perpendicularly to the air flowing direction therein, has the same shape with the cross-section of the first air passage 34a, which intersects perpendicularly to the air flowing direction therein.

Therefore, the second air passage 34b communicates with not only the predetermined first non-through hole 33a1 which directly communicates with the first air passage 34a but also a predetermined second non-through hole 33a2. Namely, the predetermined second non-through hole 33a2 is the non-through hole out of the smaller-diameter side non-through holes 33a, which exists in the position where a later-describing engaged portion 13 is provided on the inner peripheral side of the spring seat body 11. Thus, the predetermined second non-through hole 33a2 is the non-through hole which interferes with the engaged portion 13 in the radial direction.

In this case, the predetermined second non-through hole 33a2 out of the smaller-diameter side non-through holes 33a, which does not directly communicate with the first air passage 34a, makes air flow from and to the surface of the spring seat body 11 other than the upper end surface 32 by way of the second air passage 34b, the predetermined first non-through hole 33a1 which directly communicates with the first air passage 34a, and the first air passage 34a.

And the third air passage 34c (holes-connection passage in the present invention) communicates with the larger-diameter side non-through hole 33b and the smaller-diameter side non-through hole 33a which is formed closest to the larger-diameter side non-through hole 33b. Namely, the third air passage 34c serve as a passage for making air flow between the larger-diameter side non-through hole 33b and the smaller-diameter side non-through hole 33a. More specifically, the third air passage 34c is formed in the position where the distance between the smaller-diameter side non-through hole 33a and the larger-diameter side non-through hole 33b which communicate with each other is the shortest. And in the third air passage 34c, air flows in the direction from the larger-diameter side non-through hole 33b to the smaller-diameter side non-through hole 33a, or in the opposite direction thereto. The cross-section of this third air passage 34c, which intersects perpendicularly to the air flowing direction therein, has the same shape with the cross-section of the first air passage 34a, which intersects perpendicularly to the air flowing direction therein.

Namely, the larger-diameter side non-through hole 33b makes air flow to and from the surface of the spring seat body 11 other than the upper end surface 32 by way of the third air passage 34c, the predetermined first non-through hole 33a1 and the first air passage 34a. Otherwise, the larger-diameter side non-through hole 33b makes air flow to and from the surface of the spring seat body 11 other than the upper end surface 32 by way of the third air passage 34c, the predetermined second non-through hole 33a2 which do not communicate with the first air passage 34a directly, the second air passage 34b, the predetermined first non-through hole 33a1 which communicates with the first air passage 34a directly, and the first air passage 34a.

A guide portion 12 is arranged downwardly of the lower end surface 31 of the spring seat body 11. This guide portion 12 has a generally inverted conical cylinder-shaped configuration. Four cutouts 12a are formed in an outer peripheral surface of the guide portion 12 at equal distances in a circumferential direction thereof. In other words, the outer peripheral surface of the guide portion 12 has the configuration that four ribs 12b are formed on the upper, lower, left and right sides in FIG. 4. The inner diameter of this guide portion 12 is larger than the inner diameter of the inner peripheral surface of the spring seat body 11. And, as shown in FIG. 1, the largest outer diameter of the guide portion 12 is slightly less than the inner diameter of the coil spring 21. Namely, the guide portion 12 performs the guiding function when the coil spring 21 is mounted on the spring seat 10.

Three engaged portions 13 are arranged in an upper part of the inner peripheral surface of the spring seat body 11 at equal distances in a circumferential direction so as to project inwardly (toward a center axis of the spring seat body 11). These engaged portions 13 are engaged with engaging portions 22b of the body member 22. With this arrangement, the spring seat 10 is engaged with the body member 22. The upper end surfaces of the engaged portions 13 contact the lower surface of the flat plate portion 22a of the body member 22.

The spring seat 10 is assembled, as follows. First, the engaged portions 13 of the spring seat 10 are engaged with the engaging portions 22b of the body member 22. At this time, they are engaged with each other while relatively rotating the spring seat 10 and the body member 22.

Next, the guide portion 12 of the spring seat 10 is inserted into the coil spring 21. And the upper end part of the coil spring 21 is pressed on the lower end surface 31 of the spring seat body 11 of the spring seat 10. Therefore, the spring seat body 11 of the spring seat 10 is mounted between the coil spring 21 and the flat plate portion 22a of the body member 22 in a pressed state therewith. Consequently, the upper end of the coil spring 21 closely contacts the lower end surface 31 of the spring seat body 11 of the spring seat 10.

By composing the spring seat 10 as described above, the following effects are achieved. As the coil spring 21 expands and contracts upwardly and downwardly when the vehicle is running, for example, the spring seat body 11 of the spring seat 10 repeats the compression and return motions. These motions of the spring seat body 11 cause the smaller-diameter side non-through holes 33a and the larger-diameter side non-through holes 33b to repeat the compression state and the non-compression state. At this time, the non-through holes 33a and 33b communicate with the exterior of the spring seat body 11 so that air flows between the non-through holes 33a and 33b and the exterior of the spring seat body 11. Consequently, the smaller-diameter side non-through holes 33a and the larger-diameter side non-through holes 33b are not closed, as is different from the conventional arrangement, and there do not occur noises.

In addition, a plurality of non-through holes 33a and 33b are formed in the spring seat body 11 so that the spring seat body 11 does not have a plurality of columnar portions, and accordingly, has an integrally combined configuration over the entire portion thereof. Furthermore, the diameter of the non-through holes 33a and 33b is less than the diameter of a coil wire of the coil spring 21. Namely, the non-through holes 33a and 33b are small holes, as compared with the cutouts of the conventional art, which define projections. In addition, the first non-through holes 33a and the second non-through holes 33b are arranged alternately in a circumferential direction.

Even where the spring seat body 11 is interposed and pressed between the coil spring 21 and the body member 22, the stiffness of the spring seat body 11 against buckling becomes great. Namely, the spring seat body 11 is difficult to be deformed into a buckling configuration. As a result, the axial position of the coil spring 21 and that of the spring seat 10 are securely prevented from being offset from each other. The first through third air passages 34a, 34b and 34c are sufficiently small, as compared with the non-through holes 33a and 33b, so as not to greatly affect the stiffness of the spring seat body 11.

Furthermore, as the spring seat body 11 is difficult to be deformed into a buckling configuration, the external appearance quality of the outer peripheral surface of the spring seat body 11 is improved.

Since, in addition to the fact that the spring seat body 11 is difficult to be deformed into a buckling configuration, the first air passage 34a which opens in the surface of the spring seat body 11 does not open in the outer peripheral surface of the spring seat body 11, the external appearance quality of the outer peripheral surface of the spring seat body 11 is further improved.

And, the hole center O1 of the smaller-diameter side non-through hole 33a and the hole center O2 of the larger-diameter side non-through hole 33b are both offset from the position corresponding to the spring center of the coil spring 21. Therefore, many rubber parts exist in the part of the spring seat body 11, which corresponds to the spring center position of the coil spring 21 so that the spring seat 10 can properly receive loads from the coil spring 21.

(2) Second Embodiment

Figure 6:
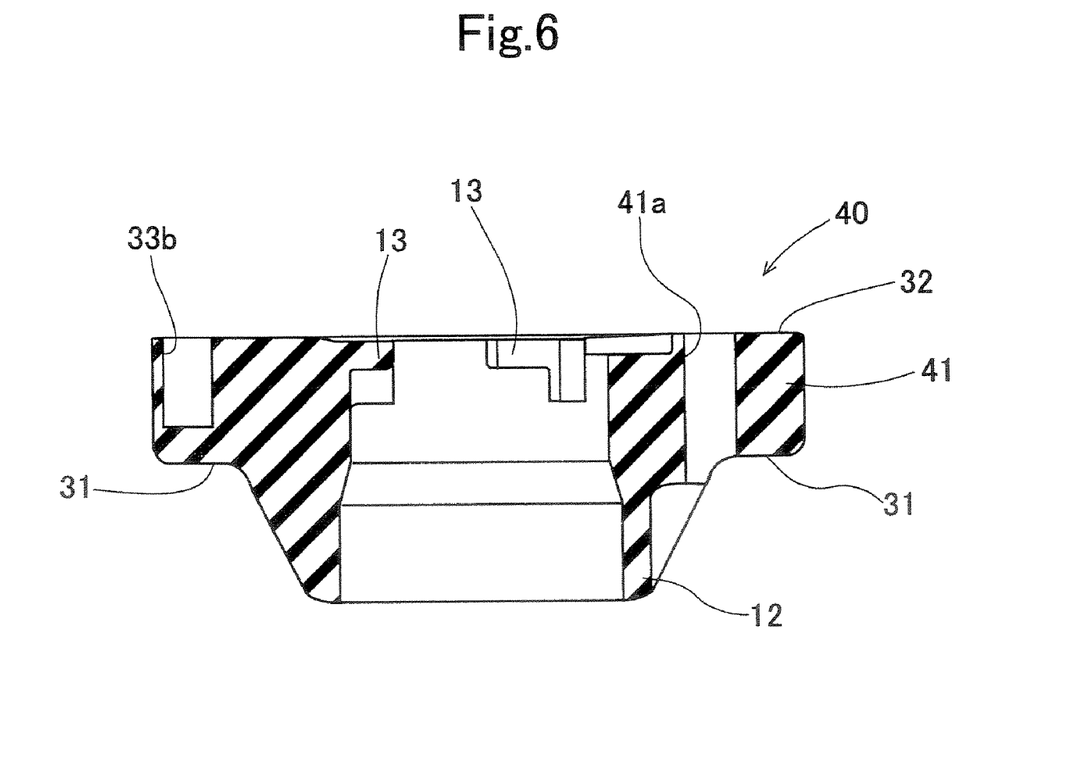
FIG. 6 is a longitudinal sectional view of a spring seat 40 in a second embodiment of the present invention.
Figure 7:
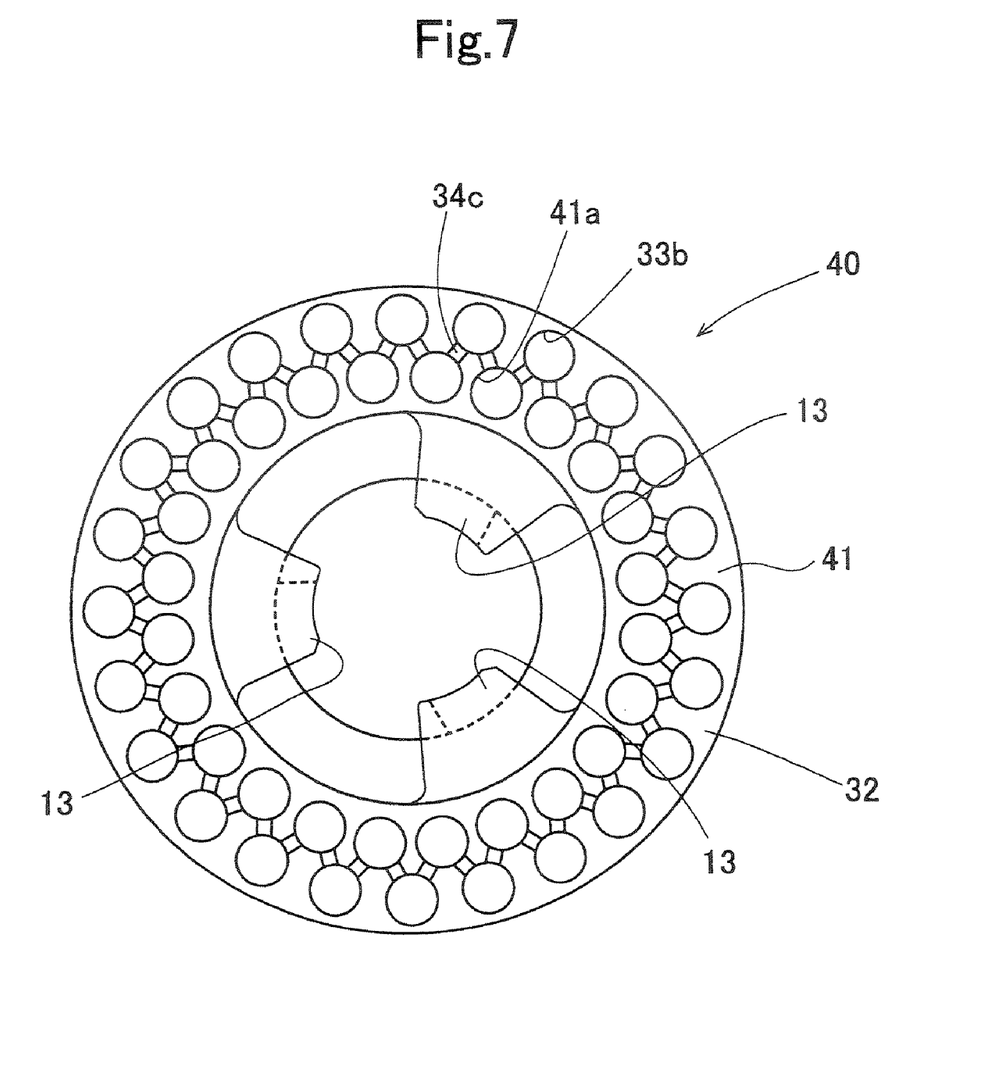
FIG. 7 is a plan view of the spring seat 40.
Figure 8:
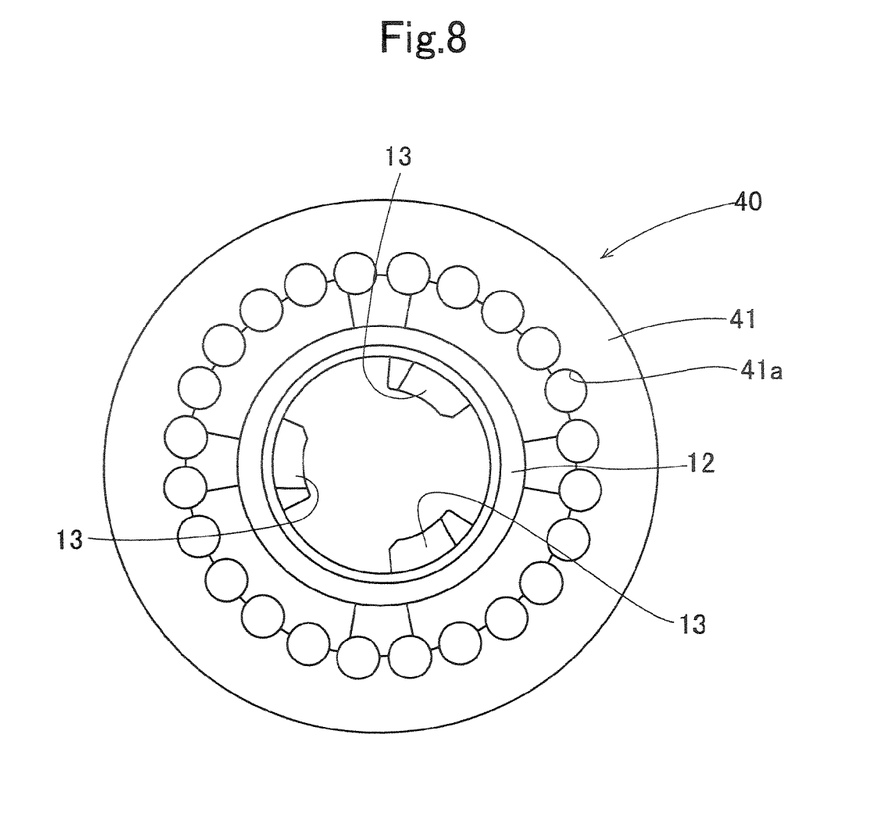
FIG. 8 is a bottom view of the spring seat 40.

And, the spring seat 10 may have other arrangement than that of the first embodiment, as follows. A spring seat 40 in a second embodiment will be explained with reference to FIG. 6 through FIG. 8. FIG. 6 shows an axial sectional view of the spring seat 40. FIG. 7 shows a plan view of the spring seat 40. FIG. 8 shows a bottom view of the spring seat 40. The spring seat 40 differs from the spring seat 10 of the first embodiment only in the spring seat body 11. In FIG. 6 through FIG. 8, parts similar to those in the first embodiment have been assigned the same reference numerals as in FIG. 1 through FIG. 5, and detailed explanations will be omitted.

As shown in FIG. 6 and FIG. 7, the spring seat body 41 of the spring seat 40 of the second embodiment has a circular cylinder-shaped configuration, and is arranged such that an axial direction thereof is directed in a vertical direction. And a lower end surface 31 and an upper end surface 32 of this spring seat body 41 are similar to the lower end surface 31 and the upper end surface 32 of the spring seat body 11 of the first embodiment.

In the spring seat body 41 of this spring seat 40, a plurality of through holes 41a and a plurality of non-through holes (corresponding to the larger-diameter side non-through holes in the first embodiment) 33b are formed. The through holes 41a correspond to the holes obtained by penetrating the smaller-diameter side non-through holes 33a of the first embodiment to the side of the lower end surface 31. Namely, the through holes 41a penetrate the spring seat body 41 from the lower end surface 31 to the upper end surface 32. In other words, the through holes 41a have openings on the side of the lower end surface 31 and on the side of the upper end surface 32. And the through holes 41a are identical to the smaller-diameter side non-through holes 33a of the first embodiment in hole diameter, hole position, etc.

And the spring seat body 41 of the spring seat 40 does not have first air passages 34a and second air passages 34b which are provided in the spring seat body 11.

The spring seat 40 of the second embodiment thus arranged differs from the spring seat 10 in air flowing route. Namely, air is made to flow between the through holes 41a and the exterior of the spring seat body 41 by way of openings of the non-through holes 33b, which are provided in the lower end surface 31. In addition, air is made to flow between the non-through holes 33b and the exterior of the spring seat body 41 by way of the third sir passages 34c and the through holes 41a. Therefore, air can be made to flow among the through holes 41a, the non-through holes 33b and the exterior of the spring seat body 41, similarly to the first embodiment.

(3) Third Embodiment

Figure 9:
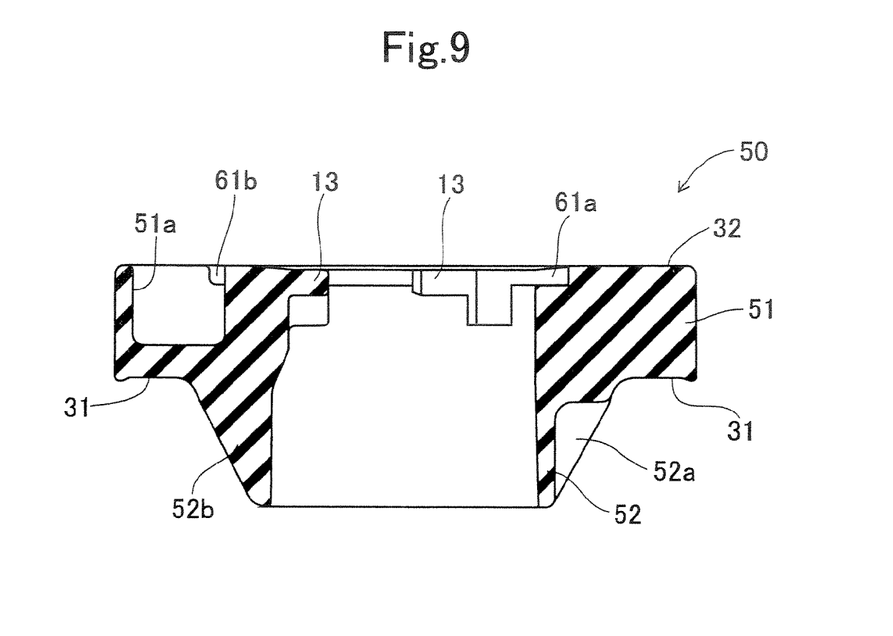
FIG. 9 is a longitudinal sectional view of a spring seat 50 of a third embodiment of the present invention.
Figure 10:
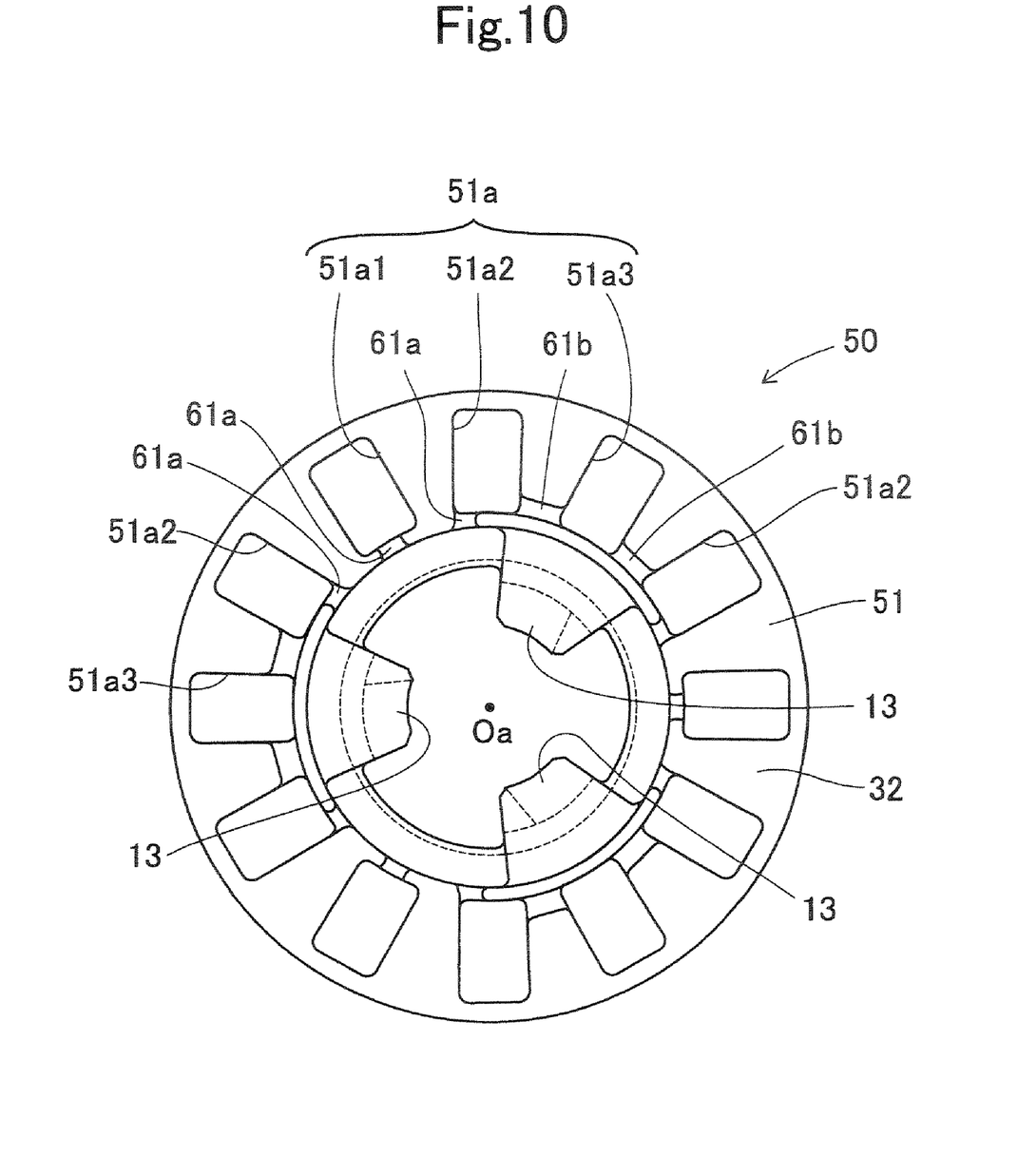
FIG. 10 is a plan view of the spring seat 50.
Figure 11:
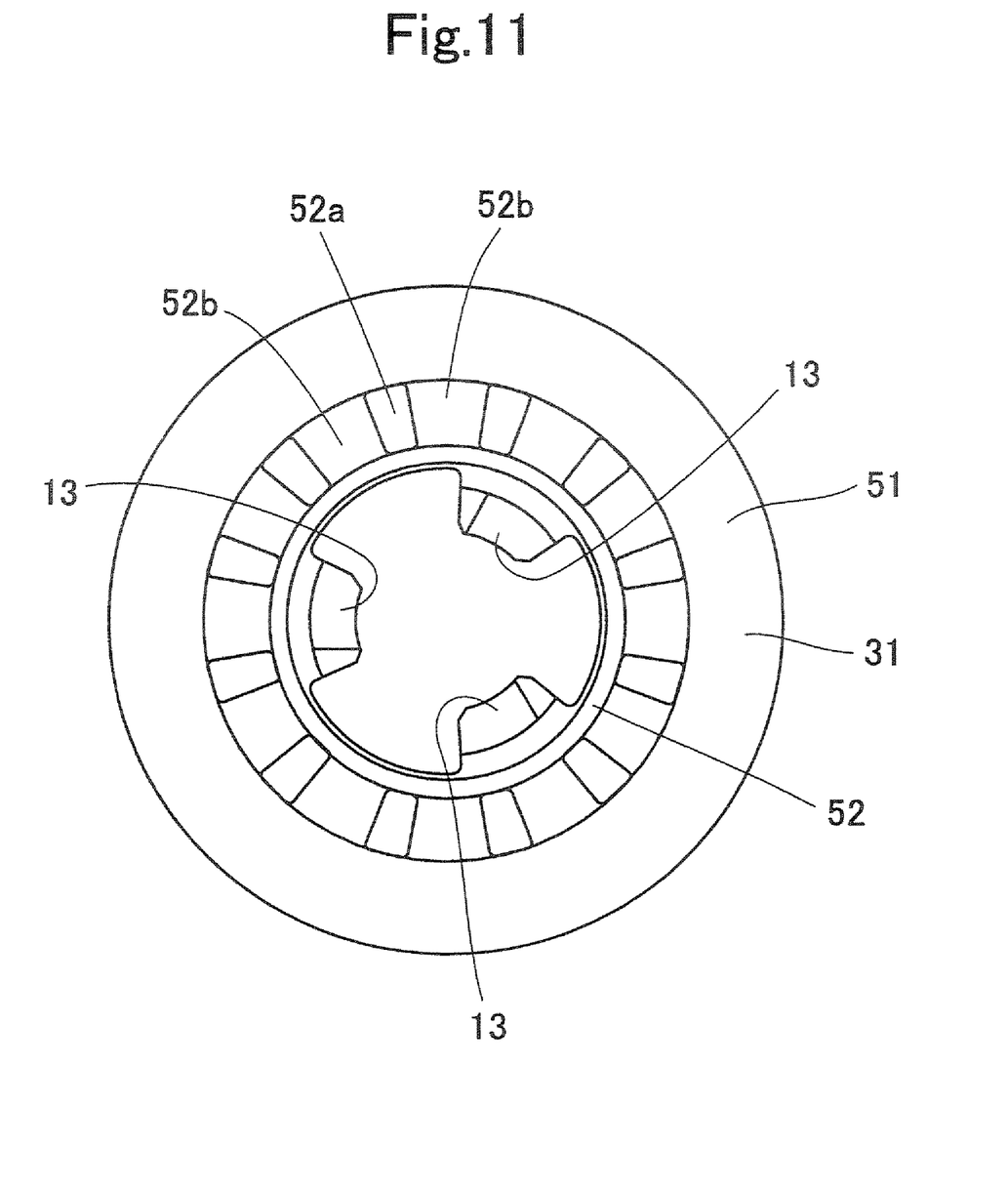
FIG. 11 is a bottom view of the spring seat 50.

And, a spring seat 50 of the third embodiment will be explained with reference to FIG. 9 through FIG. 11. FIG. 9 shows an axial sectional view of the spring seat 50 of the third embodiment. FIG. 10 shows a plan view of the spring seat 50. FIG. 11 shows a bottom view of the spring seat 50. In the spring seat 50 of the third embodiment, parts similar to those in the spring seats 10 and 40 of the first embodiment and the second embodiment have been assigned the same reference numerals as used in these preceding embodiments, and detailed explanations will be omitted.

As shown in FIG. 9 through FIG. 11, the spring seat 50 of the third embodiment has a spring seat body 51, a guide portion 52 and engaged portions 13.

The spring seat body 51 has a circular cylinder-shaped configuration, and is arranged such that an axial direction thereof is directed upwardly and downwardly. And a lower end surface 31 and an upper end surface 32 of the spring seat body 51 are similar to the lower end surface 31 and the upper end surface 32 of the spring seat body 11 of the first embodiment.

And, In the spring seat body 51, a plurality of non-through holes 51a are formed in a circumferential direction thereof at equal distances. These non-through holes 51a are formed so as to be directed from the upper end surface 32 toward the lower end surface 31. Namely, these non-through holes 51a are formed in a direction parallel to the axial direction of the spring seat body 51. And these non-through holes 51a do not reach the lower end surface 31 of the spring seat body 51.

And these non-through holes 51a have approximately the same rectangular shape over the entire position of the axial direction thereof. Namely, the openings and the bottoms of the non-through holes 51a respectively have the same rectangular configuration with each other. And the rectangular configuration of these non-through holes 51a has the configuration of which the longitudinal direction is identical to the radial direction of the spring seat body 51. More specifically, the diameter of a circle which contacts one of longitudinally opposed surfaces of the non-through holes 51a, which is positioned near the axial center Oa of the spring seat body 51, is less than the spring center diameter Ds of the coil spring 21 (shown in FIG. 1), whereas the diameter of a circle which contacts the other one of longitudinally opposed surfaces of the non-through holes 51a, which is positioned away from the axial center Oa of the spring seat body 51, is greater than the spring center diameter Ds of the coil spring 21.

Furthermore, in the spring seat body 51, a plurality of first air passages 61a and a plurality of second air passages 61b are formed. The first air passages 61a and the second air passages 61b are formed in an upper end surface 32 of the spring seat body 51 into a groove-shaped configuration, respectively.

One end of the first air passage 61a communicates with predetermined first non-through holes 51a1 and 51a2 out of the non-through holes 51a, whereas the other end of the first air passage 61a opens in the inner peripheral surface of the spring seat body 51. Namely, the first air passages 61a communicate with the predetermined first non-through holes 51a1 and 51a2 and the inner peripheral surface of the spring seat body 51.

In this case, the predetermined first non-through holes 51a1 and 51a2 with which the first air passages 61a directly communicate are respectively the non-through hole of which at least one part does not interfere with the engaged portion 13 in a radial direction. In FIG. 9, the predetermined first non-through holes 51a1 and 51a2 out of the plurality of non-through holes 51a are nine in total. The first air passages 61a communicating with three predetermined first non-through holes 51a1, which do not interfere with the engaged portions 13, are formed so as to extend from a generally widthwise center of the predetermined fist non-through holes 51a1 to the inner peripheral surface of the spring seat body 51 in radial directions thereof. The first air passages 61a communicating with the remaining six predetermined first non-through holes 51a2, which locally interfere with the engaged portions 13, are respectively formed so as to extend from one widthwise end of the predetermined first non-through hole 51a2 to the inner peripheral surface of the spring seat body 51 in radial directions thereof. In this case, one widthwise end of the predetermined first non-through hole 51a2 communicating with the first air passage 61a is the part which does not interfere with the engaged portion 13 in a radial direction. In FIG. 9, the other widthwise end of the predetermined fist non-through hole 51a2 interferes with the engaged portion 13 in a radial direction.

The cross-section of the first air passages 61a, which intersects perpendicularly to the air flowing direction (the radial direction of the spring seat body 51) has a rectangular shape, similarly to the cross-sectional shape of the first air passage 34a of the first embodiment. And the area of the cross-section of the first air passage 61a, which intersects perpendicularly to the air flowing direction therein, is made to be less than the area of the cross-section which intersects perpendicularly to the axial direction (vertical direction in FIG. 9) of the predetermined first non-through holes 51a1 and 51a2.

Namely, the predetermined first non-through holes 51a1 and 51a2 communicating with the first air passages 61a directly make air flow to the surfaces of the spring seat body 51 other than the upper end surface 32 by way of the first air passages 61a.

And the second air passages 61b (connection passages between holes in the present invention) connect adjacent non-through holes 51a with each other. More specifically, at least one end of the second air passage 61b communicates with the predetermined second non-through hole 51a3 out of the non-through holes 51a. In this case, the predetermined second non-through hole 51a3 is the non-through hole which interfere with the engaged portion 13 in a radial direction. In FIG. 9, there exist three predetermined second non-through holes 51a3 out of a plurality of non-through holes 51a. And in the third embodiment, the predetermined first non-through holes 51a2 are formed adjacent to both sides of the predetermined second non-through hole 51a3.

Accordingly, in the third embodiment, the second air passage 61b connects the predetermined second non-through hole 51a3 with the adjacently positioned predetermined first non-through hole 51a2. Where the predetermined second non-through holes 51a3 are formed sequentially, this second air passage 61b may connect the sequentially formed predetermined second non-through holes 51a3 with each other.

And this second air passage 61b is formed in the position where the distance between the predetermined second non-through holes 51a3 and the adjacently located predetermined first non-through hole 51a2 is the shortest. Namely, the second air passage 61b is formed in the position where the predetermined second non-through hole 51a3 and the adjacently located predetermined first non-through hole 51a2 are connected on the side nearest to the axial center Oa. The cross-section of this second air passage 61b, which intersects perpendicularly to the air flowing direction therein, has the same shape with the cross-section of the first air passage 61a, which intersects perpendicularly to the air flowing direction therein.

And the predetermined second non-through holes 51a3 make air flow to the surfaces of the spring seat body 11 other than the upper end surface 32 by way of the second air passages 61b, the predetermined first non-through holes 51a2 communicating with the first air passages 61a directly, and the first air passages 61a.

The guide portion 52 is arranged downwardly of the lower end surface 31 of the spring seat body 51. This guide portion 52 has a generally inverted conical cylinder-shaped configuration. As shown in FIG. 9 and FIG. 11, twelve cutouts 52a are formed in an outer peripheral surface of the guide portion 52 at equal distances in a circumferential direction. In other words, the outer peripheral surface of the guide portion 52 has the configuration that twelve ribs 52b are formed in a circumferential direction. The inner diameter of this guide portion 52 is the same as that of the inner diameter of the inner peripheral surface of the spring seat body 51. And, as shown in FIG. 9, the largest outer diameter of the guide portion 52 has the diameter slightly less than the inner diameter of the coil spring 21. Namely, the guide portion 52 performs the guiding function when the coil spring 21 is mounted on the spring seat 50.

By composing the spring seat 50, as described above, the following effects are achieved. As the coil spring 21 expands and contracts upwardly and downwardly when a vehicle is running, for example, the spring seat body 51 of the spring seat 50 repeats the compression and return motions upwardly and downwardly. These motions of the spring seat body 51 cause the non-through holes 51a to repeat the compression state and non-compression state. At this time, the non-through holes 51a communicate with the exterior of the spring seat body 51 so that air flows between the non-through holes 51a and the exterior of the spring seat 51. Consequently, the non-through holes 51a do not become closed, as is different from the conventional arrangement, and there do not occur noises.

In addition, a plurality of non-through holes 51a are formed in the spring seat body 51 so that the spring seat body 51 does not have a plurality of columnar portions, and accordingly, has an integrally combined configuration over the entire portion thereof. Namely, the non-through holes 51a are small holes, as compared with the conventional cutouts which define projections.

Therefore, even where the spring seat body 51 is interposed and pressed between the coil spring 21 and the body member 22, the stiffness against buckling becomes great. Namely, the spring seat body 51 becomes difficult to be deformed in a buckling configuration. As a result, the axial position of the coil spring 21 and that of the spring seat 50 are securely prevented from being offset from each other. The first air passages 61a and the second air passages 61b are sufficiently small, as compared with the non-through holes 51a so as not greatly affect the stiffness of the spring seat body 51.

Furthermore, as the spring seat body 51 becomes difficult to be deformed in a buckling configuration, the external appearance quality of the outer peripheral surface of the spring seat body 51 is improved.

Since the first air passages 61a do not open in the outer peripheral surface of the spring seat 51 in addition to the arrangement that the spring seat body 51 is difficult to be deformed into a buckling configuration, the external appearance quality of the outer peripheral surface of the spring seat body 51 is further improved.

What is claimed is:

1. A spring seat of a suspension for an automotive vehicle, which is interposed between a coil spring and an opposed member for reducing transmission vibrations between the coil spring and the opposed member, the opposed member being one member selected from a body member and a support member for a wheel, comprising:
   a spring seat body composed of an elastic rubber body which is closely attached to an end of the coil spring, and contacts the opposed member,
   wherein said spring seat body includes:
      a first surface adapted to be closely attached to said end of the coil spring,
      a second surface which is located on the side of a rear surface of said first surface for contacting the opposed member,
   a plurality of non-through holes, each having an opening on the side of said second surface, and being formed to be directed toward said first surface from said second surface,
   first air passages, each connecting a predetermined first non-through hole out of said plurality of non-through holes and an inner peripheral surface of said spring seat body, and
   holes-connection passages for connecting two non-through holes out of said plurality of non-through holes with each other.

2. A spring seat of a suspension for an automotive vehicle according to claim 1, wherein each of said holes-connection passages connects said predetermined first non-through hole which directly communicates with one of said first air passages, and a predetermined second non-through hole out of said plurality of non-through holes which does not directly communicate with said air passages.

3. A spring seat of a suspension for an automotive vehicle according to claim 2, wherein said predetermined second non-through hole makes air flow to and from said inner peripheral surface of said spring seat body by way of the holes-connection passages, the predetermined first non-through hole, and the first air passages.

4. A spring seat of a suspension for an automotive vehicle according to claim 1, further comprising an engaged portion which projects from said inner peripheral surface of said spring seat body inwardly for engagement with an engaging portion of said opposed member, wherein said predetermined first non-through hole is a non-through hole of which at least one part does not interfere with said engaged portion in a radial direction thereof.

5. A spring seat of a suspension for an automotive vehicle according to claim 2, wherein said spring seat body is composed of a cylindrical body having an inner peripheral surface, and further comprising an engaged portion which projects from said inner peripheral surface of said spring seat body inwardly for engagement with an engaging portion of said opposed member, said the other end of each of said first air passage opening in said inner peripheral surface of said spring seat body, said predetermined first non-through hole being a non-through hole of which at least one part does not interfere with said engaged portion in a radial direction thereof, and at least one end of each of said holes-connection passages communicating with the predetermined second non-through hole out of said non-through holes, which interferes with said engaged portion in a radial direction thereof.

6. A spring seat of a suspension for an automotive vehicle according to claim 1, wherein each of said first air passages has a cross-section intersecting perpendicularly to the air flowing direction therein, of which the area is not more than the area of an opening of said predetermined first non-through hole in said second surface.

7. A spring seat of a suspension for an automotive vehicle according to claim 1, wherein each of said holes-connection passages has a cross-section intersecting perpendicularly to the air flowing direction therein, of which the area is not more than the area of an opening of each of said two non-through holes communicating with said holes-connection passages in said second surface.

8. A spring seat of a suspension for an automotive vehicle according to claim 1, wherein said plurality of non-through holes includes a plurality of smaller-diameter side non-through holes, each having a hole center on a first diameter, and a plurality of larger-diameter side non-through holes, each having a hole center on a second diameter greater than said first diameter, and said smaller-diameter side non-through holes and said larger-diameter side non-through holes are alternately arranged in a circumferential direction of said spring seat body.

* * * * *